Jan. 2, 1951 K. R. DYE 2,536,843
APPARATUS FOR CLEANING AUTOMOBILES WITH
THE AID OF WATER AND SOFT PELLETS
Filed May 1, 1947 2 Sheets-Sheet 1
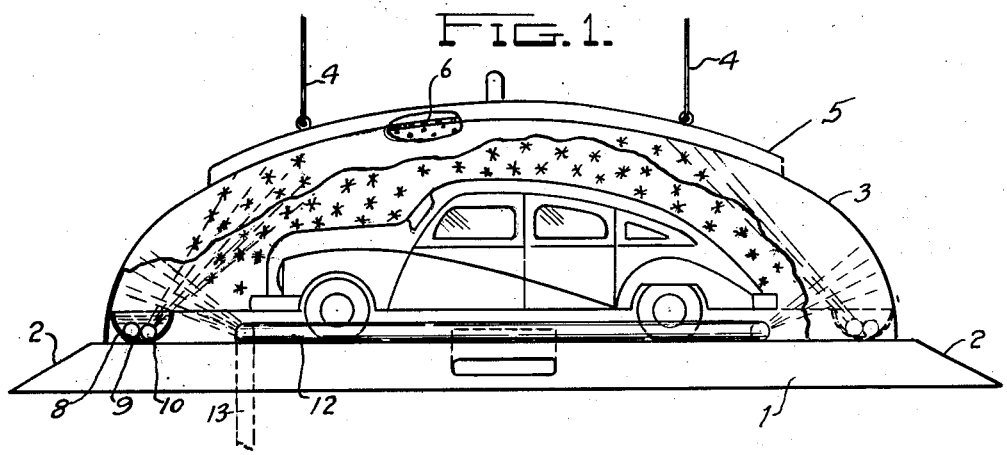
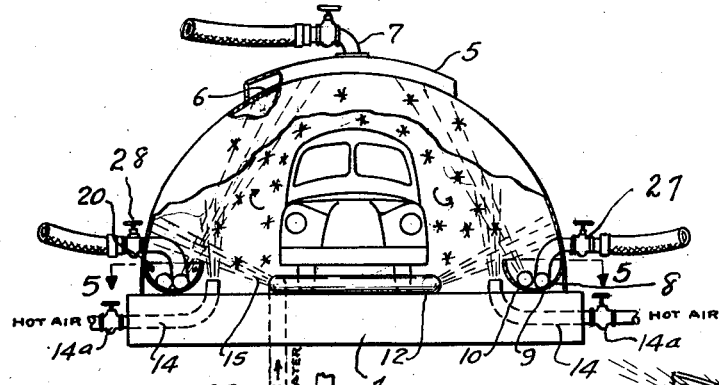
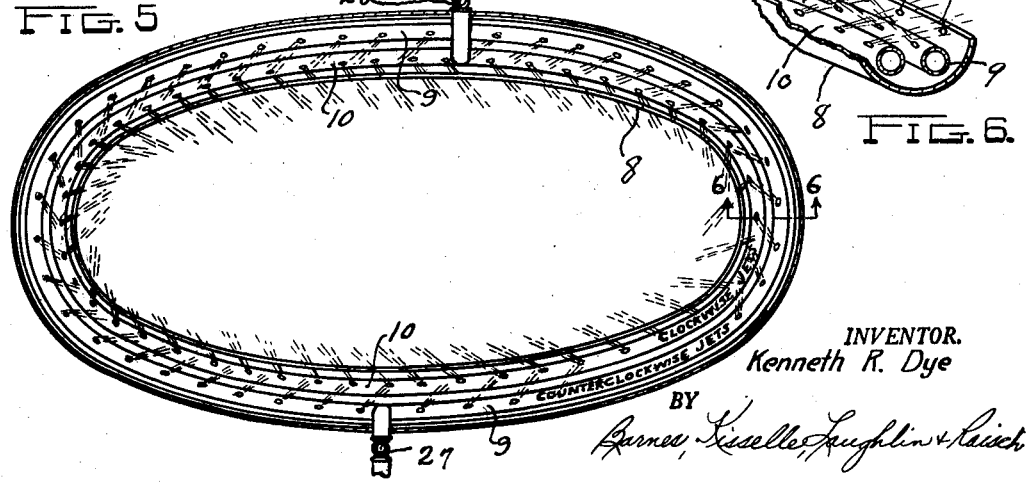
INVENTOR.
Kenneth R. Dye
BY
Barnes, Kisselle, Laughlin & Raisch
ATTORNEYS Jan. 2, 1951 K. R. DYE 2,536,843
APPARATUS FOR CLEANING AUTOMOBILES WITH
THE AID OF WATER AND SOFT PELLETS
Filed May 1, 1947 2 Sheets-Sheet 2
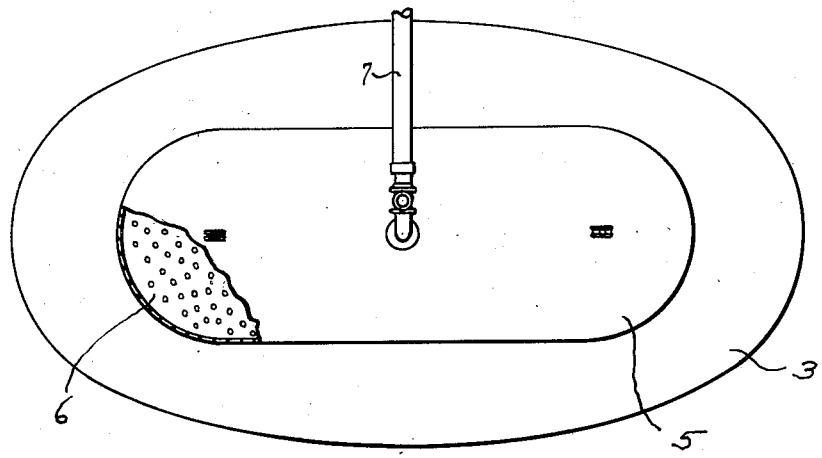
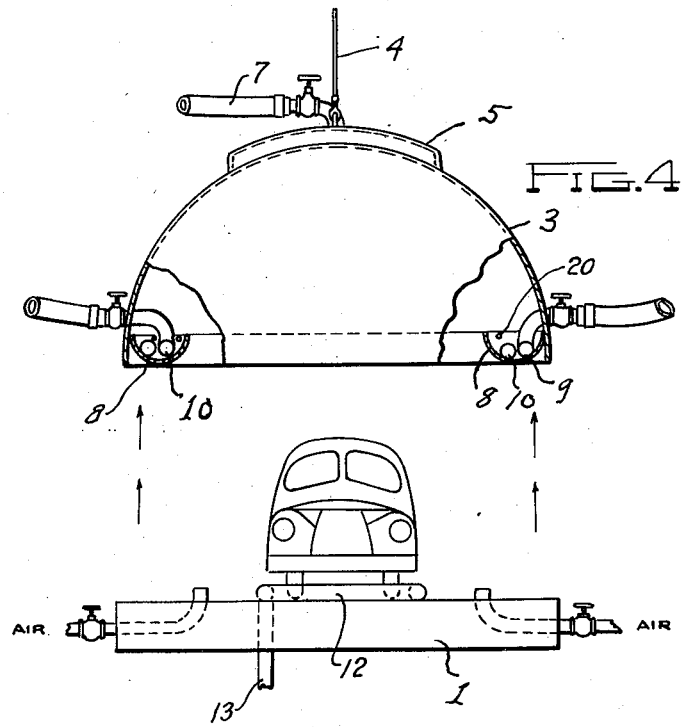
INVENTOR.
Kenneth R. Dye
ATTORNEYS Patented Jan. 2, 1951

2,536,843

UNITED STATES PATENT OFFICE 2,536,843

APPARATUS FOR CLEANING AUTOMOBILES WITH THE AID OF WATER AND SOFT PELLETS

Kenneth R. Dye, Marine City, Mich.

Application May 1, 1947, Serial No. 745,179

7 Claims. (Cl. 15—1)

1

This invention relates to apparatus for washing and cleaning cars, particularly automobiles.

It is the object of the invention to provide an apparatus which is adapted to remove mud and other foreign matter from the car by bombarding it with pellets and water. The pellets are automatically recovered by the apparatus and returned to position for re-use.

In the drawings:

Fig. 1 is a side elevation of the apparatus, partly in section.

Fig. 2 is an end elevation, partly in section.

Fig. 3 is a top plan view with a part broken away.

Fig. 4 is an end elevation, partly broken away, showing the hood lifted to allow the car to enter or be taken off the platform.

Fig. 5 is a section taken on the line 5—5.

Fig. 6 is a fragmentary perspective of the same.

A platform or base 1 is provided having tapered ends 2 to provide ramps for the car to be driven onto the platform or off the platform. Of course, it is not necessary to use a platform as the apparatus might be built right into the floor, but I have shown a platform as this is the most convenient way to install the apparatus in a building that has already been erected. I provide a hood or shroud 3 which can be raised and lowered by means of cables 4 that are operated by power or apparatus having a mechanical advantage, such as pulleys, winches, etc., which need not be and are not shown. This hood has an offset 5 at the top which provides a water or liquid distributing chamber. A perforated plate 6 is fitted below the offset portion of the hood and conforms to the general curvature of the hood. This plate has a great many perforations. Consequently, when water is delivered through the water conduit 7 it provides a shower of water. This water distributing chamber constitutes a spray head. If desired, some chemical may be mixed with the water, but this is a matter of choice and not necessity.

Secured to the inside of the hood at the bottom is an elliptical trough 8 and in this trough are two pipes 9 and 10 for delivering compressed air or water under pressure. These are provided with jet openings for delivering jets in a way later to be described. This trough together with the pipes 9 and 10 lifts with the hood. The trough is perforated near the top at 20 to prevent overflow. The trough is secured to the inside of the hood by welding, riveting or any other suitable way.

On the platform 1 is another elliptically-laid-out pipe 12 which is supplied with water by means of pipe 13. At each side of the water pipe 12 is an air duct 14.

The operation of the apparatus is as follows:

When the car is driven up a ramp 2 onto the platform and over the water pipe 12 it is brought

2 as nearly as possible in the center of the elliptical space defined by the pipe 12. The hood is then lowered over the car. The trough 8 has been supplied with quite a number of soft pellets, preferably kapoc, or equivalent material. These have been distributed over the entire length of the trough.

The compressed air or water under pressure is then turned on by opening one of the valves 27 or 28 controlling the fluid flow to pipes 9 or 10. Jet openings are drilled in these pipes so as to give the jets an upwardly-directed slant, as shown both in Figs. 1 and 2. At the same time, the jets on one pipe are slanted in the direction of the axis of the pipe so as to be directed clockwise when viewed from above or in plan. The jets of the other pipe, to wit: the outer pipe 9, are directed counterclockwise. The reason for this difference in the direction of the jets is so that the turbulence and the bombardment of pellets may at one time on one side of the car be from forward rearwardly and on the other side of the car from rearward forwardly, and on the ends from right to left on one end and left to right on the other end. Then the fluid is turned off in one pipe and turned on in the other pipe. The bombardment is just reversed. On the side where the turbulence and the bombardment are from front to rear it now becomes from rear to front, and on the other side where it has been rear to front, becomes front to rear, and on the ends the direction of bombardment and turbulence is just reversed. This is desirable and necessary to reach all the surfaces on the body otherwise some of the surfaces would be on the lee side of the turbulence or bombardment and would not be subjected to the cleansing and wiping action which is afforded by the pellets. But with this reversal of the turbulence of the bombardments by means of first turning the fluid into one pipe and shutting it off and then turning the fluid into the other pipe, all the surfaces are subjected to the cleansing and rubbing action of the soft pellets. While this is going on water is being thrown in the jets 15 from the pipe 12 which immediately surrounds the car. These jets form a film of water leading from below the car to a point just above the troughs. This forms a moving screen of water which serves to catch the pellets that drop from above and carries them back into the trough where they rest on the surface in position to be again shot up against the top of the hood and thence deflected down onto the car by these high-pressure fluid blasts that issue from the jet openings of the pipes 9 and 10.

After the car has been subjected to this bombardment of soft pellets from each pipe 9 and 10, the water in the overhead shower is turned off and the fluid valve is turned off. Then the air (preferably hot) is turned into the hood by means of the valves 14a in the pipes 14. This subjects the car to a quick drying action and after a few minutes the hood may be raised by the power or mechanical means, the car driven over the pipe 12 and down one ramp 2.

This bombardment of the car with soft pellets removes grease and dirt in a way that is not possible by simply subjecting the car to a water shower. It can be done quickly, efficiently, and cheaply as the pellets are substantially all returned to the trough where they float on the surface below the edges of the trough and may be re-used in subsequent cleaning operations on other cars.

I claim:

1. Apparatus for washing and cleaning vehicles, having in combination a hood that may be raised and lowered with respect to the vehicle and which is provided along the top with a water-distributing shower head and which is provided along the lower edge on the inside with means for shooting pellets of soft material upwardly against the vehicle and the top of the hood for deflection against the car.

2. Apparatus for washing and cleaning vehicles, having in combination a hood that may be raised and lowered with respect to the vehicle and which is provided along the top with a water-distributing shower head and which is provided along the lower edge on the inside with means for shooting pellets of soft material upwardly against the vehicle and the top of the hood for deflection against the car and means for catching the pellets and returning them to their positions for shooting again.

3. Apparatus for washing and cleaning vehicles, comprising a hood that may be raised and lowered with respect to the car and which has on the inside of the top a shower for distributing water over the car, a trough secured on the inside at the lower edge for containing water and pellets of soft material, means for supplying the trough with water and a pipe for supplying fluid under pressure to said trough and having jets directed upwardly toward the car and the top of the hood to shoot the pellets of soft material against the vehicle for the purpose of cleaning the same.

4. Apparatus for washing and cleaning vehicles, comprising a hood that may be raised and lowered with respect to the car and which has on the inside of the top a shower for distributing water over the car, a trough secured on the inside at the lower edge for containing water and pellets of soft material, means for supplying the trough with water, a pipe for supplying fluid under pressure to said trough and having jets directed upwardly toward the car and the top of the hood to shoot the pellets of soft material against the vehicle for the purpose of cleaning the same, and a water pipe immediately around the car and under the same delivering jets or a screen of water from under the car and immediately over the trough to catch the pellets and return the same to the trough.

5. Apparatus for washing and cleaning vehicles, comprising a hood that may be raised and lowered with respect to the car and which has on the inside of the top a shower for distributing water over the car, a trough secured on the inside at the lower edge for containing water and pellets of soft material, means for supplying the trough with water and a pipe for supplying fluid under pressure to said trough and having jets directed upwardly toward the car and the top of the hood to shoot the pellets of soft material against the vehicle for the purpose of cleaning the same, a second fluid pressure pipe in said trough with jets directed upwardly toward the car and toward the top of the hood, the jets of the two pipes in the trough being slanted in opposite directions for the purpose of giving a turbulence and bombardment of pellets in opposite directions.

6. Apparatus for washing and cleaning vehicles, comprising a hood that may be raised and lowered with respect to the car and which has on the inside of the top a shower for distributing water over the car, a trough secured on the inside at the lower edge for containing water and pellets of soft material, means for supplying the trough with water and a pipe for supplying fluid under pressure to said trough and having jets directed upwardly toward the car and the top of the hood to shoot the pellets of soft material against the vehicle for the purpose of cleaning the same, a second fluid pressure pipe in said trough with jets directed upwardly toward the car and toward the top of the hood, the jets of the two pipes in the trough being slanted in opposite directions for the purpose of giving a turbulence and bombardment of pellets in opposite directions, and valves by which the fluid may be controlled in the pipes to cause a turbulence and bombardment in one direction by using the fluid first in one pipe and then closing off that pipe and causing a turbulence and bombardment in the opposite direction thereby opening the valve for the other pipe.

7. Apparatus for washing and cleaning vehicles, comprising a hood that may be raised and lowered with respect to the car and which has on the inside of the top a shower for distributing water over the car, a trough secured on the inside at the lower edge for containing water and pellets of soft material, means for supplying the trough with water and a pipe for delivering fluid under pressure to said trough and having jets directed upwardly toward the car and the top of the hood to shoot the pellets of soft material against the vehicle for the purpose of cleaning the same, a second fluid pressure pipe in said trough with jets directed upwardly toward the car and toward the top of the hood, the jets of the two pipes in the trough being slanted in opposite directions for the purpose of giving a turbulence and bombardment of pellets in opposite directions, and a water pipe immediately around and under the car delivering jets to form a moving screen of water from under the car immediately over the trough for catching and returning the pellets to the trough.

KENNETH R. DYE.

REFERENCES CITED

The following references are of record in the file of this patent:

UNITED STATES PATENTS

| Number | Name | Date |
|---|---|---|
| 1,193,495 | Abramo | Aug. 8, 1916 |
| 1,866,197 | Cunningham | July 5, 1932 |
| 1,907,411 | Timoney | May 2, 1933 |
| 1,914,739 | Gorke | June 20, 1933 |
| 1,934,494 | Gillespie | Nov. 7, 1933 |
| 1,977,386 | Holes | Oct. 16, 1934 |
| 2,311,670 | Lamont | Feb. 23, 1943 |